June 9, 1953 V. M. MORREL 2,641,166
CONTINUOUS HEAT-SEALING APPARATUS
Filed July 18, 1952 2 Sheets-Sheet 1
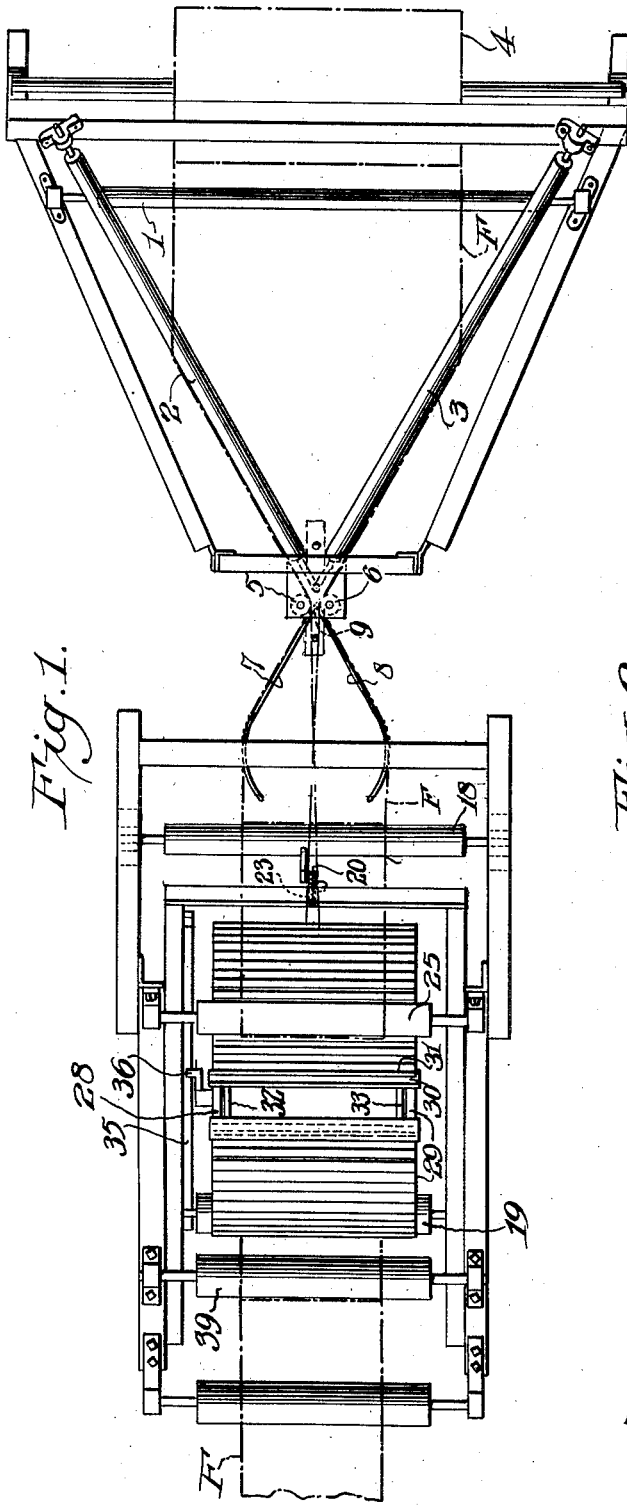
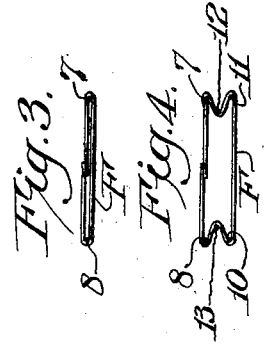
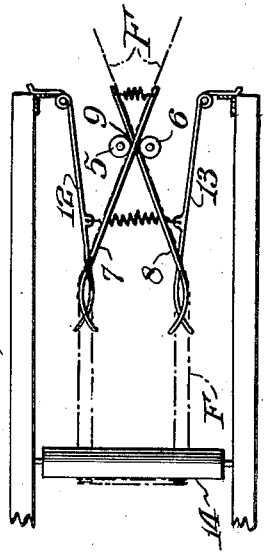
INVENTOR.
Victor Munroe Morrel
BY
ATTORNEY.

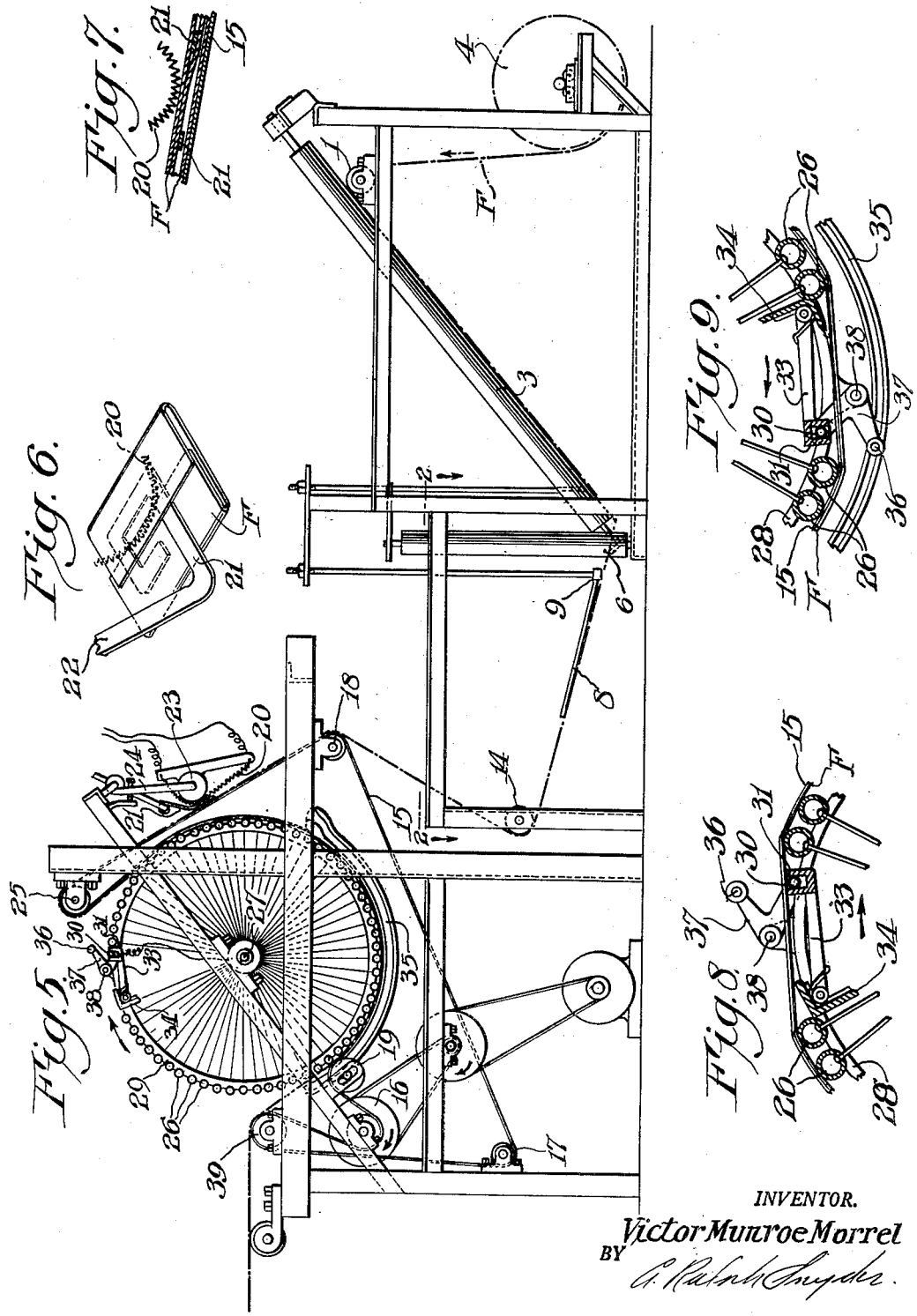

Patented June 9, 1953

2,641,166

UNITED STATES PATENT OFFICE 2,641,166

CONTINUOUS HEAT-SEALING APPARATUS

Victor Munroe Morrel, West Chester, Pa., assignor to E. I. du Pont de Nemours and Company, Wilmington, Del., a corporation of Delaware Application July 18, 1952, Serial No. 299,587

5 Claims. (Cl. 93—18)

This invention relates to the manufacture of bags from homogeneous thermoplastic film, and, more particularly, to improved bag making machinery and devices for longitudinally and transversely heat-sealing a travelling web of homogeneous thermoplastic film.

Most of the bag fabricating and sealing devices presently available for polyethylene film and similar types of limp, flexible, homogeneous thermoplastic film are based on intermittent rather than on continuous operation in the heat-sealing cycles and are not capable of high speed production. Furthermore, available machines are not suitable for the high speed production of large bags of polyethylene and like thermoplastic film now in demand.

The "dead" fold properties of stiffness and inelasticity of materials like paper and cellophane make it possible to successfully draw these materials through a system of stationary plates and guide surfaces and form flat or gusseted tubing. The friction in a conventional stationary plate-forming system results in the application of relatively high tension in the center of the web, while little tension and no positive control over travel is effected at the edges of the web. However, elastic and limp films like polyethylene tend to sway from side to side and go out of control under these conditions. In the case of gusseted bags, a material which will not take a "dead" fold is particularly difficult to fabricate into tubing of uniform size on such equipment. In addition to the disadvantages of unequal tension distribution on plate type formers, the overall or total tension applied to cellophane, paper and the like on this type of former is excessive for elastic films. Under these tensions, elastic films, i. e., polyethylene and the like, stretch; and control of cut-off length and register of printed film become a problem.

An object of this invention, therefore, is to provide bag making machinery capable of continuously handling limp, flexible, homogeneous thermoplastic film at high rate of speed. Another object is to provide bag making machinery having high speed, continuous longitudinal and transverse heat-sealing means. Still another object is to provide improved means for heat-sealing folded, continuously travelling webs of polyethylene film and like homogeneous thermoplastic film materials both longitudinally and transversely. These and other objects will more clearly appear from the following description, reference being had to the accompanying drawings wherein:

Figure 1 is a top plan view of the bag making machine;

Figure 2 is a detailed sketch of the adjustable spreader forks for controlling the width of the tubing, and cooperating adjustable gusseting forks for use in fabricating gusset type bags;

Figure 3 is a sectional view of the tubing and multiple spreader forks on the line 3—3 of Figure 1;

Figure 4 is a sectional view on the line 4—4 of Figure 2;

Figure 5 is a side elevation of the bag machine of Figure 1;

Figure 6 is a detailed sketch of an element of the longitudinal heat-sealing means in position;

Figure 7 is a longitudinal section view showing the disposition of the longitudinal sealing means relative to the tubing supported on the endless belt;

Figure 8 is an enlarged view of the transverse sealing bar and mechanism relative to its sealing position on the cylindrical transverse sealing section; and Figure 9 is an enlarged view of the transverse heating bar in non-sealing position.

Referring particularly to Figures 1 and 5, the initial portion of the apparatus, that is, the feed roll 1, the idler rolls 2 and 3 forming a V around which the film F, from supply roll 4, is folded, and the vertically disposed parallel idler rolls 5 and 6 at the intersection of the axis of the idler rolls 2 and 3, constitute a more or less conventional mechanism operative to convert the film from a flat sheet into a folded V having overlapped edges. Any known continuous technique of converting a continuous flat sheet of film into the form of a folded V may be employed in place of the combination of rolls described above provided that the technique is adaptable to the relatively low tension applied in moving the film continuously through the apparatus. For example, the idler rolls arrange in V-form and one of the vertically disposed rolls in the apparatus described above may be eliminated and the film fed from a position at right angles to the position of feed shown in Figures 1 and 5. From this position, the film may be passed around one vertically disposed idler roll, the film being folded in half (in the form of a closed V) as it moves around the vertical idler roll. Thereafter, the process of handling the film would be identical to that illustrated in the accompanying drawings. Adjustable spreader forks 7 and 8 fixed at a fulcrum 9 within the V of the folded sheet serve to define and fix the ultimate width of the tubing or bags. Depending upon the type of bag desired, i. e., flat or gusseted, additional spreader forks 10 and 11, identical to forks 7 and 8 (see Fig. 3) may be employed to form gussets in cooperation with adjustable gusseting forks 12 and 13 installed to contact the outside of the continuous tubing. After the continuous film of homogeneous thermoplastic film has been folded, as described, it is compressed to a substantially flat form, on horizontally disposed idler roll 14, and is thence conducted to a point where it merges with a flat fabric endless belt 15, driven by a positively driven roll 16 over guide rolls 39, 17, 18, 25 and 19, and partly over the cylindrical structure hereinafter described. It is at this juncture that uniform tension is applied to the tubing, the tension being effected as the tubing lies flat against and moves cocurrently with the fabric belt.

Longitudinal sealing of the folded film at the overlap to complete formation of the tubing is accomplished by the electrically heated sealing element 20 of coiled (or straight) bare electrical resistance material, e. g., resistance wire, in combination with the generally U-shaped supporting member 21 having one arm inwardly bent or extended as illustrated in detail in Figure 6. The combination of the curved heat-sealing element 20 and the U-shaped supporting member 21 which functions to separate the overlapping layers of film to be sealed from the lower adjacent layer on back side of the tubing is highly advantageous and is an outstanding advancement in the technique of rapidly producing a continuous longitudinal seal. The U-shaped member is inserted into the folded tubing in such a manner that the closed end of the U is inserted between the overlapped edges of the film, and positioned so that the top layer of film rides over both arms of the U and the lower layer rides over the arm having the inwardly bent extension and under the other arm. A support 22 for the U-shaped member (the U-shaped member and its support may be fabricated from a single length of a strip of any thin gauge metal, for example, stainless steel, aluminum, etc.) is pivotally mounted on the machine frame and is so set that the two overlapping layers of the film are raised slightly away from the back side of the tubing and the spread between the arms of the U is such that the sealing element can be pressed against the film between the arms. Hence, with the combination of a flexible sealing element and U-shaped support, there is nothing immediately adjacent the lower side of the overlapping layers of film which would interfere with the sealing operation, i. e., which would adhere to the seal. It is to be understood that the supporting member 21 may take other than the U-shaped form shown. It is only necessary that the shape be such that the member can be inserted in the tubing to separate the overlapping top layers from the bottom layer or back side of the tubing and support the overlapping edges of the continuously moving tubing at areas closely adjacent to, but not coinciding with the area being contacted by the sealing element whereby to effectively heat-insulate the overlapping top layers from the bottom layer to prevent adherence of the seal to the back of the tube or to other materials. Thus, a slightly spiralled open ring structure could be used in place of the U-shaped structure illustrated. The longitudinal heat-sealing element 20 (electrically heated from any suitable source, not shown) may be in the form of a thin flexible coil of bare resistance wire or in the form of a single sealing wire. The sealing element is shown in the form of a slightly curved section, i. e., shaped like a sled runner, and the supporting means therefor, 23 and 24, also pivotally mounted in the machine frame, should be adjustable so that the contact of the sealing element with the surface of the film may be adjusted depending upon the temperature of the sealing element and the speed at which the film is moving. Instead of being in the form of a curved section, the portion of the sealing element which contacts the film may be flat and adjustably mounted so that the time of contact between the element and the film may be controlled by increasing or decreasing the length of the sealing element which contacts the film. Under the high speeds at which the apparatus of the present invention is operable, i. e., up to 200–225 feet per minute, the sealing element is adjusted to apply slight pressure upon the layers of film to be sealed by deflecting the film very slightly with the weight of the sealing element from the normal path of travel of the film. The actual temperature of the longitudinal sealing element will depend upon the nature of the thermoplastic polymeric film being sealed; for example, in the case of polyethylene film, the sealing element is usually maintained at a dull red heat which is probably within the range from 1000°–1200° F., in any event, not below 600° F.

After the folded film has been sealed longitudinally, the tubing thus formed which is moving cocurrently with and supported by the fabric belt 15, is passed over an idler roll 25 and into contact with the peripheral surface of a rotating cylindrical structure or drum, the peripheral surface being composed of a multiplicity of spaced metal tubes 26 disposed parallel to the axle 27 and removably mounted in end rings 28 and 29 which, in turn, are mounted on the axle 27 for rotation therewith. The cylindrical structure or drum is driven by reason of its frictional engagement with the moving tubing carried by the endless belt. An electrically heated transverse sealing bar composed of an electric heating element or rod 30 seated in channel member 31 is supported on arms 32 and 33 pivotally mounted on angle support member 34 fixed to the rotating cylindrical structure adjacent the periphery and disposed parallel to the axis thereof. The sealing bar is normally spring-urged outwardly between the adjacent spaced tubes to contact and, hence, heat-seal the tubing as it is carried with and between the endless belt and the cylindrical structure. The heat-sealing bar is normally coated with polytetrafluoroethylene. Alternatively, the surface of the sealing bar may be separated from the tubing by a glass fabric having a coating of polytetrafluoroethylene. Obviously, this is necessary to prevent adherence between the sealing bar and the film. The dwell time, that is, the time the heat-sealing bar is in contact with the tubing, of the transverse sealing element is entirely adjustable by a cam means comprising a cam slot 35 adjustably mounted independently of the drum at the end thereof, and a cam follower 36 attached to the sealing bar through a bell crank 37 pivotally mounted on the drum at 38. The sealing element remains in contact with the film until the cam follower enters the end of the cam slot at which point the sealing bar is depressed and thereby removed from contact with the film surface to permit the seal to cool while the tubing is being carried substantially free of tension between the belt and drum. By this arrangement, it is obvious that the dwell time may be adjusted within reasonable limits depending upon the desired rate of operation. Furthermore, the construction of the cylindrical structure provides for installation of additional transverse sealing elements on the peripheral surface of the cylinder by removing the necessary number of metal tubes and mounting the sealing bar therebetween.

The tubing supported upon the fabric belt moves with the peripheral surface of the cylindrical structure to a point where the continuous tubing is conducted over a guide roll 39 and continuously away from the apparatus to any conventional cutting means (not shown). The cutting means may be in the form of a knife edge moving reciprocally in a vertical direction. It is important to point out that the transverse seal has adequate time to cool from the point where the cam means carried the sealing bar out of contact with the tubing to the point where the tubing is separated from the fabric belt. Usually, little difficulty is encountered in separating the continuous tubing from the endless fabric belt. Occasionally, there will be very slight adherence at the points of the transverse seals. This may be substantially avoided by employing a fabric belt which has been coated with a waxy material or which has a light coating of polytetrafluoroethylene. Since the endless fabric belt employed for supporting and applying tension to the continuous thermoplastic tubing is not subjected directly to high temperatures and does not come into direct contact with molten polymer, the fabric belt does not have to have outstanding heat resistant qualities. A woven cotton fabric having a relatively rough surface is entirely suitable. On the other hand, various other types of fabrics woven from glass, nylon, polyethylene terephthalate, acrylonitrile, and various other natural or synthetic fibers may be employed. The main properties desired are that the belt is so woven as to present a rugged surface to the adjacent surface of the continuous thermoplastic tubing, and that the belt is of sufficient strength to be maintained under tension in order to avoid sagging during movement over the various tension-applying rolls.

In producing a satisfactory transverse seal with polyethylene film, the minimum dwell time is about 0.1 second. At this dwell, the temperature of the transverse sealing element must be maintained substantially above the melting point of the film. The melting point of polyethylene is about 103°–104° C., and temperatures as high as 150° C. may be used. A dwell time of 0.25 second is preferred, and the actual temperature of the transverse sealing bar may be adjusted to a somewhat lower temperature accordingly. In most cases, the dwell time for polyethylene film should not be greater than about 0.5 second; and this may be provided for by operating the apparatus at a final speed of above about 40 feet per minute. Obviously, the minimum and maximum dwell times will vary for other types of thermoplastic polymeric films. As a general comparison, the sealing apparatus embodied in copending application U. S. Serial No. 218,754, filed April 2, 1951, in the names of D. E. Drew and W. M. Farrelly, is capable of making up to 150 transverse seals per minute; whereas, the apparatus of the present invention is capable of making up to 360 transverse seals per minute.

The sealing apparatus of the present invention is particularly adaptable to high speed longitudinal and transverse sealing of limp flexible films similar to polyethylene. However, the apparatus is entirely adaptable and operable with other types of well known polymeric materials which may be readily formed into films such as polyvinyl chloride, copolymers of vinyl chloride and vinyl acetate, rubber hydrochloride polymer, polyvinylidene chloride, polyethylene terephthalate, etc.

As many widely different embodiments may be made without departing from the spirit and scope of my invention, it is to be understood that said invention is in no wise restricted save as set forth in the appended claims.

I claim:

1. A bag making machine comprising in combination, means for continuously folding the longitudinal edges of a continuously advancing web of thermoplastic material inwardly and in overlapping relationship to define a flattened tubing consisting of a back side and partially overlapping top sides, positively driven endless belt conveyor means for supporting and advancing said tubing substantially free from tension, a heated element positioned to contact the uppermost top side of the supported tubing at the overlap whereby to impose a continuous longitudinal heat-seal joining the overlapped top side of the tubing, means for heating-insulating the top sides from the back side of the advancing supported tubing within the overlap area in contact with said heated element, a rotatable drum positioned to contact the top side of said belt and the heat-sealed tubing thereon over the major portion of the circumference of said drum whereby the drum is driven by said belt, an elongated heated element shiftably mounted on said drum for rotation therewith and located at the periphery of the drum in a position to normally contact the tubing on the drum on a line transverse of the tubing whereby to seal together the front and back sides of said tubing on a transverse line, cam means operative to shift said elongated heated element out of contact with said tubing at a predetermined point before the tubing is taken from said drum and to maintain said elongated heated element out of contact with the transversely sealed tubing, and means for guiding the tubing out of contact with said drum and belt.

2. The apparatus of claim 1 wherein the means for folding the web comprises a pair of rods adjustably pivoted together at one end to provide adjustable separation of the free ends, said free ends being inwardly curved and so disposed in the path of the web that the web is caused to be folded over said arms at the curved free ends thereof.

3. The apparatus of claim 1 wherein the heated element is a bare electrical resistance element heated to a temperature of at least about 600° F. and mounted for contact with said tubing.

4. The apparatus of claim 1 wherein said heat-insulating means comprises a pivotally-mounted, U-shaped member having one arm inwardly extended, said member being so positioned that the closed end of the U lies transversely of the tubing between the overlapped top sides and the back side of said tubing, the inwardly extended arm lies under the lower top side and over the bottom of said tubing, and the other arm of the U lies under the upper top side and over the lower top side of said tubing.

5. The apparatus of claim 4 within the heated element is a bare electrical resistance element heated to a temperature of from about 600° to about 1200° F., and mounted for contact with said tubing.

VICTOR MUNROE MORREL.

No references cited.